350-96.18
XR 3,235,672
SEARCH ROOM
2

SUBSTITUTE FOR MISSING XR

Feb. 15, 1966 F. P. BEGUIN 3,235,672

OPTICAL SOUND RECORDING AND REPRODUCTION

Filed Nov. 17, 1961 4 Sheets-Sheet 1

INVENTOR
FRED P. BEGUIN
BY Louis L. Gagnon
ATTORNEY

OPTICAL SOUND RECORDING AND REPRODUCTION

Filed Nov. 17, 1961 4 Sheets-Sheet 2

INVENTOR
FRED P. BEGUIN
BY
Louis L. Gagnon
ATTORNEY

Feb. 15, 1966 F. P. BEGUIN 3,235,672

OPTICAL SOUND RECORDING AND REPRODUCTION

Filed Nov. 17, 1961

4 Sheets-Sheet 3

INVENTOR
FRED P. BEGUIN
BY
Louis L. Gagnon
ATTORNEY

INVENTOR
FRED P. BEGUIN
BY
Louis L. Gagnon
ATTORNEY

United States Patent Office 3,235,672
Patented Feb. 15, 1966

3,235,672

OPTICAL SOUND RECORDING AND REPRODUCTION

Fred P. Beguin, Sturbridge, Mass., assignor to American Optical Company, Southbridge, Mass., a voluntary association of Massachusetts Filed Nov. 17, 1961, Ser. No. 152,979
11 Claims. (Cl. 179—100.3)

This invention relates to sound recordings, method and apparatus for making and utilizing the same and has particular reference to novel fiber optical means and method for making photographic recordings of sound and for electro-optically playing back such recordings.

A principal object of the invention is to provide novel photographic recordings of sound and means and method for making the same on substrates such as conventional recording discs, drums, tapes or film materials or the like, and for electro-optically playing back said recordings.

Another object is to provide fiber optical means for producing and/or playing back recordings of the above character.

Another object is to provide recordings of the above character which may be monaural or binaural for sound perspective.

Another object is to provide novel styli embodying fiber-like light-conducting elements for use in producing photographic recordings of sound and/or for reproducing said sound from said recordings.

Another object is to provide sound recordings embodying styli tracking grooves without lateral and/or vertical mechanical modulations or indentures wherein substantially no lateral or vertical motion is produced in tracking said grooves during recording or playback.

Another object is to provide recording and playback systems of the above character in which a minimum of wear is existent upon the recording and/or the tracking styli and wherein the fidelity of the system is enhanced by the elimination of the usual mechanical background noises and rumble inherent in conventional electro-mechanical systems.

Another object is to provide a photographic recording system wherein the usual problems relating to hum, acoustic feedback and capacitive effects or microphonics of electrical conducting cables or the like in conventional electro-mechanical systems are avoided.

Another object is to provide a recording and playback system of the above character which is especially suited for the production of sound reverberation in monaural or stereophonic playback.

A further object is to provide a novel fiber optical sound reverberation system.

A still further object is to provide sound recordings and systems for making and utilizing the same which are simple and economical in construction, embody a minimum of electrical and mechanical components and wherein the systems are readily adaptable to all aspects of sound recording and reproduction.

Other objects and advantages of the invention will become apparent from the following description when taken in conjunction with the accompanying drawings in which.

Referring more particularly to the drawings wherein like characters of reference designate like parts throughout the various views, the appending description will first relate to the making of grooved disc type recordings and their playback and will subsequently deal with the making and playback of other types of recordings such as those made on tapes or film either of an opaque or transparent nature.

Figures 1, 2, 3, 4, 5, 6, 25:
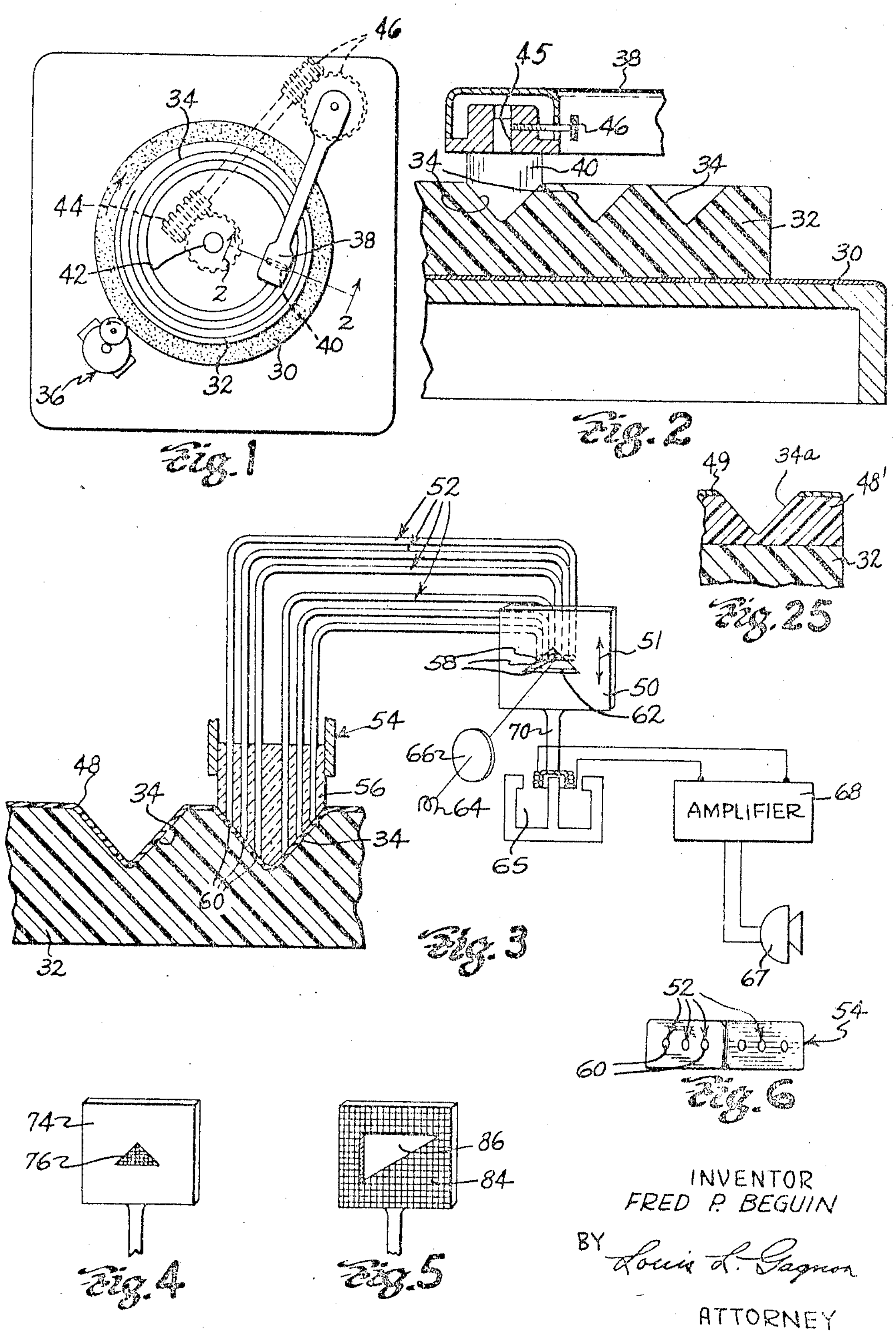
FIG. 1 is a plan view diagrammatically illustrating the general arrangement of a typical disc cutting, recording and/or playback device.
FIG. 2 is an enlarged cross-sectional view taken on line 2—2 of FIG. 1 looking in the direction indicated by the arrows wherein a groove cutting stylus is illustrated as being in use.
FIG. 3 is a diagrammatic illustration of a monaural recording system and apparatus including a recording stylus of the type embodied in a preferred aspect of the invention.
FIGS. 4 and 5 illustrate some of several possible modifications of portions of the apparatus shown in FIG. 3.
FIG. 6 is an end view of the stylus shown in FIG. 3.
FIG. 25 is an enlarged fragmentary cross-sectional view of a modified groove type recording medium.

In FIG. 1, there is shown a disc supporting turntable 30 upon which is placed, in conventional fashion, a recording disc 32 shown in the process of being cut or provided with a continuous V-shaped spiral groove 34. While the disc 32 is shown throughout the drawings as being formed entirely of a plastic composition, it should be understood that the disc 32 might be of any other conventional nature such as those embodying a metallic substrate upon which is provided a plastic, gelatin or wax or any other such medium which is adapted to be grooved and provided with a sound track in the manner to be described in detail hereinafter.

The groove 34 is cut by rotating the turntable 30 with a suitable conventional motor driven friction drive unit 36 or the like while simultaneously moving the cutting head 38 carrying the cutting stylus 40 laterally or substantially radially across the disc 32 at a precontrolled rate in accordance with the rate of turn of the turntable 30 so as to produce a desired pitch or spacing between the respectively formed turns or helices of the spiral groove 34. The cutting head 38 is shown, for purposes of illustration, as being driven from the turntable spindle 42 by gearing 44 and 46.

It is pointed out that the disc cutting apparatus of FIGS. 1 and 2 has been shown only for purposes of illustration since it is immaterial to this invention as to how or by what means the recording disc 32 is grooved and it should be understood that any conventional disc cutting device may be employed to produce the spiral grooves 34 in the recording disc 32. Unconventionally, however, the stylus 40 is rigidly mounted in the cutting head 38 in any suitable manner such as by means of the socket 45 and set screw 46 arrangement (FIG. 2) and is not laterally or vertically modulated. That is, in all instances, the groove 34 is cut smooth and continuous with no mechanical modulations of the side walls or bottom area thereof. Alternatively, the groove 34 may be molded or pressed into the disc 32 if desired.

Other than having smooth or unmodulated side walls, the groove 34 is preferably conventional in size, shape and helix angle and the recording discs are, accordingly, selected to be of appropriate diameters such as would normally be used in producing conventional 78, 45 or 33⅓ r.p.m. recordings or others of different speeds if desired.

Once the recording disc 32 has been grooved, it is provided with a photoemulsion layer 48 (see FIG. 3) which may be of any conventional nature and which is bonded to the material of the disc 32. The photoemulsion layer 48 might, for example, be of a gelatin base embodying the usual silver nitrate compound used in camera films or the like. The manner of applying the photoemulsion layer 48 would be identical to that used in the practice of making conventional photographic films or plates or the like and the material of the recording disc 32 is selected to be of such a plastic composition or is so treated as to be compatible with the conventional process of applying such emulsions to films or plates or the like for photographic purposes. Vinyl plastice, acetates, acetate-butyrates or polyesters or other well known compositions are suitable for this purpose. In the usual manner of applying photoemulsion to plastics which are not directly receptive to such emulsions, these plastics are subcoated conventionally and thereafter provided with the photoemulsion.

The photoemulsion layer 48 may be considerably thicker than that shown in FIG. 3 and might, for example, be of a thickness greater than the depth of the spiral groove 34 as illustrated in FIG. 25 by the reference numeral 48'. In this way, the disc 32 would be provided with the photoemulsion layer 48' prior to the cutting of the groove 34*a* and the groove 34*a* would be subsequently cut, moulded or pressed directly into the photoemulsion layer 48'. An opaque protective coating 49 may be provided over the photoemulsion layer 48' to prevent exposure of the layer 48' to light prior to cutting and the operation of cutting the groove 34*a* would remove the opaque coating in the area of the groove 34*a*.

Various other types of photosensitive mediums such as diazo type compounds or non-silver emulsions using dichromates or other die formers or coupling agents may be used and all of which would be of the commercially available type and well known in the art relating to the making and processing of articles such as films or photographic plates.

The layer 48 or 48' which will be referred to hereinafter as the photosensitive layer 48 or 48' may also be in the nature of photoresists formed of gelatin, carboxy methyl cellulose or polyvinylalcohol containing a photosensitive ingredient such as ammonium or potassium dichromate or the like. In general the photosensitive layer 48 or 48' might embody any conventional medium which is in the nature of a photographic emulsion or photoresist or the like and is applied and processed after exposure by the techniques of this invention in the established manner of producing photographic images upon exposed photosensitive films or plates or the like.

The present invention relates to the making of photographic reproductions of sound and in the aspect of the invention which relates more particularly to FIGS. 1–7 in the drawings, these photographic sound reproductions are made on the inclined side walls of the V-groove 34 in the recording disc 32. Therefore, the photosensitive layer 48 is applied to the side walls of the V-groove 34 as shown. In the drawings, the photosensitive layer 48 is shown as being extended over the entire grooved side of the recording disc 32 only for the reason that this manner of application would be most practical and more in accordance with the usual practice of applying a continuous emulsion layer to photographic films or plates or the like.

Once the disc 32 has been provided with the photosensitive layer 48, the side walls of its spiral groove 34 are exposed to light which is modulated in accordance with the frequency modulations of sound to be recorded. This is accomplished through the use of a sound wave or acoustic power-to-electrical energy-to-light energy transducer embodying a light modulating shutter 50 which is electro-mechanically oscillated in response to electrical signals which are modulated by and in accordance with sound waves to be recorded. The modulated light is transferred to the inclined surfaces of the groove 34 by means of optical light-conducting fibers 52 which extend into and through a stylus 54. The stylus 54 is arranged to fit into the groove 34 and track the same from end to end as the recording disc 32 is rotated.

In making the photographic recording of sound in the groove 34, the recording disc 32 having the photosensitive layer 48 thereon is placed upon the turntable 30 of the apparatus shown in FIG. 1 and the cutting stylus 40 in the head 38 is removed and replaced with the recording stylus 54. The gearing 44 and 46 is disengaged to permit the head 38 to pivot freely without being driven by the turntable spindle 42 and thereby allow the stylus 54 to track the groove 34 as the turntable 30 is rotated by its drive arrangement 36.

In view of the fact that it would be rather troublesome and inconvenient to convert the apparatus in FIG. 1 from its setup for cutting grooves to the one just described for recording, it is preferable to utilize the apparatus of FIG. 1 strictly for cutting and provide a second piece of equipment like that shown in FIG. 1 wherein no driving connection is provided between the turntable spindle and head 38 and also wherein the recording stylus and optical fibers 52 are permanently fixed in place within a recording head like the one designated as 38 in FIG. 1. It should be understood that any conventional recorder having a recording head arranged to receive and support the stylus 54 and optical fibers 52 might be used. It is only required that the head be so arranged as to allow the stylus 54 to track the groove 34 freely and not be driven during the operation of recording which is diagrammatically illustrated in FIG. 3.

The stylus 54 (FIG. 3) is preferably formed to comprise a body part 56 made up with a V-shaped depending portion which is of substantially the same configuration as that of the groove 34. The body part 56 is also arranged to support the optical fibers 52 with their respective adjacent ends exposed at the V-shaped underside of the stylus 54 and preferably in flush relation therewith as shown in FIG. 6. The optical fiber ends may be slightly recessed from the under side of the stylus if desired. The body portion 56 of the stylus 54 may be formed of quartz, sapphire, glass or of a moulded or machined piece of metal or relatively hard plastic such as Plexiglas or any other well known rigid plastic material. The fibers 52 may be laminated between two pieces of the material which is selected for use in making up the body portion 56 or inserted through holes provided from top to bottom through the body portion 56 or, the body portion material might be moulded around the optical fibers in the shape of the finished stylus 54. In all cases, the surfaces of the stylus 54 which are intended to engage or be positioned adjacent the photosensitive layer 48 in the groove 34 are highly polished and rendered free of all sharp corners or edges.

The optical fibers which may range in size from only a few microns in diameter to a few thousandths of an inch in diameter as will be described in more detail hereinafter are preferably formed of optical glass. While certain plastics may be used in the fabrication of the fibers 52, it is well known that optical fibers which are formed of preselected optical glasses are the most efficient and practical conductors of light.

Since the light receiving ends 58 of the optical fibers 52 are grouped together in side-by-side relation as shown in FIG. 3 and it is preferred that each optical fiber should contain all light received thereby while transferring the same to its opposite end, the sides of the optical fibers 52 are preferably individually clad with a light insulating material which will not appreciably attenuate light passing therethrough and which will function to prevent light from passing laterally through the fiber sides into adjoining fibers.

While various types of glasses having different light-conducting properties may be used in the construction of the optical fibers 52, a typical optical fiber might embody a core section formed of optical flint glass or the like having an index of refraction of approximately 1.66 with a relatively thin cladding of crown type or soda lime glass having an index of refraction of approximately 1.52. A cladding to core thickness ratio of approximately 1 to 10, respectively, is generally suitable for providing an adequate light-insulating effect. This ratio, however, may be deviated from to provide thicker or thinner claddings in accordance with the types and indices of glasses used in the construction of the optical fibers 52. It is pointed out that the optical fibers 52 might be provided with core parts formed of special glasses characterized to be primarily transmissive to selected regions of the spectrum and the claddings may be formed of glasses having controlled light-absorbing or other special characteristics. The optical fibers 52 may be circular in cross-section as illustrated in FIG. 3 or, they might be square, rectangular, hexagonal or of any other suitable cross-sectional shape. Also, they may be of the so-called "monofilament" type wherein each embodies a single core section or they may be of the type referred to as "multifibers' wherein each optical fiber embodies a plurality of core sections which are individually light-insulated from one another.

The monofilament type of optical fibers may, for example, be formed by placing a rigid heat-softenable rod-like member of energy-conducting core material within a tubular member of heat-softenable cladding material wherein the assembly of said rod and tube members is heated and drawn endwise to a fiber size. Alternatively, similar materials might be heated to flowable conditions and extruded simultaneously, one surrounding the other, to form optical fibers such as 52. These techniques for forming optical fibers are set forth in detail in Patent Nos. 2,980,957 and 2,992,517 respectively. It should, however, be understood that other suitable optical fibers forming processes might be used. Multifibers are formed by drawing a bundle of clad monofilaments, as a unit, down to a fiber size and a method of making this latter type of fiber is shown, for example, in Patent No. 2,992,516.

Referring more particularly to FIG. 3, it will be seen that in photographically recording sound in the groove 34, the recording stylus 54 in placed in the groove 34 with the ends 60 of the optical fibers 52 engaging or immediately adjacent to the photosensitive layer 48 as shown. The recording disc 32 is rotated on a driven turntable such as 30 (FIG. 1) or the like with the stylus 54 being free to follow the groove 34 from its beginning adjacent the outer edge of the recording disc 32 to its end adjacent the central portion of the recording disc 32. The light modulating shutter 50 which, in the present instance (FIG. 3) is opaque with a triangular transparent section or light slit 62, is placed over the light-receiving ends 58 of the optical fibers 52 while light from a suitable source 64 is directed toward said ends 58 of the optical fibers 52 by means of an optical lens element or lens system 66 or the like.

The light modulating shutter 50 is oscillated in the direction of the planes of the ends 58 of the fibers 52 (see arrow 51) at a frequency and amplitude controlled by and in accordance with the frequency and amplitude of the sound which is to be recorded. The oscillation of the light modulating shutter is accomplished conventionally by means of a transducer 65 operating in response to sound received by a conventional microphone or the like 67 which sound is converted into electrical energy and amplified at 68 to operate the transducer 65. The light modulating shutter 50 is provided with a connection 70 to the transducer 65 by means of which the shutter 50 is caused to oscillate at a frequency and amplitude matching those of the sound waves received by the microphone 67.

Figure 7:
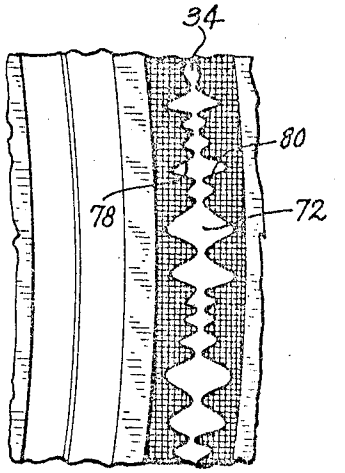
FIGS. 7, 8, 9 and 10 are diagrammatic plan views of various types of photographic sound recordings or tracks obtainable with apparatus of the above general character.
Figure 8:
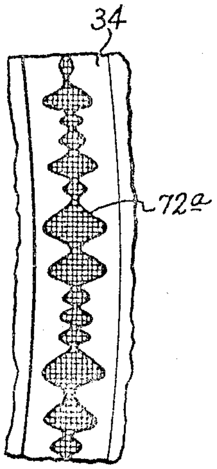

In oscillating as described above, the light slit 62 of the shutter 50 allows more or less light to enter the array of the optical fiber ends 58 along the length of the array which, when transferred through the optical fibers onto the photosensitive layer 48 of the recording disc 32, exposes said layer 48 in the manner shown in FIG. 7 or 8. The rotation of the recording disc causes this exposure to extend along the length of the groove 34 so as to produce what will be referred to hereinafter as the sound track 72 in FIG. 7 or 72*a* in FIG. 8. For correct reproduction, the recording disc 32 is rotated at a rate equal to that at which it is to be subsequently rotated for playback. That is, if the playback is to be at 78, 33⅓ or 45 revolutions per minute, the sound track would be photographically produced with the recording disc rotating at whatever one of these speeds is selected. Other speeds of recording and playback can obviously be used. The sound tracks 72 and 72*a* are of the constant density or variable area type and their particular sine wave configurations are determined by the frequency and amplitude of modulation of the light producing the same and the rate at which the recording disc is rotated.

Since the more commonly used photoemulsions produce negative or reversed copies wherein portions thereof which are exposed to light become dark when the emulsion is developed, the resultant sound track produced with the photosensitive layer 48 being of the usual type of photoemulsion would appear as shown by 72*a* in FIG. 8 when using a transparent triangular light slit 62 such as shown in FIG. 3. By using a direct positive photoemulsion for the layer 48, however, a positive sound track such as shown by 72 in FIG. 7 might be produced. Direct positive photoemulsions are well known in the photographic art. Alternatively, in order to produce a sound track such as is shown by 72 in FIG. 7 when using a negative photoemulsion for the layer 48, one might replace the light-modulating shutter 50 with the shutter 74 shown in FIG. 4 wherein the triangular area 76 is opaque upon a transparent background.

As it is known in the art of sound reproduction, optimum performance is obtained in playback when a sound track has a minimum of light areas and, therefore, the sound track 72 shown in FIG. 7 is preferred over that shown in FIG. 8. Excessive light areas tend to produce undesirable background noise in playback.

In recording with light modulating shutters 50 or 74 such as shown in FIGS. 3 and 4, the transducer 65 which is illustrated as operating the shutter 50 may be equipped with conventional noise reduction circuitry so as to produce what is known as a noiseless system. For reasons of avoiding undue complication in the illustration of the present invention the noise reduction circuitry is not shown since its character and application to a transducer such as shown by 65 in FIG. 3 is well known. This circuitry functions to adjust the mean position of the light modulating member 50 in accordance with the changes from high to low amplitudes so as to bring the opposite edges 78 and 80 of the photographic sound track as close together as possible substantially as illustrated in FIG. 7 throughout the length of the rack 72 regardless of the size of sine wave modulations.

Figure 9:
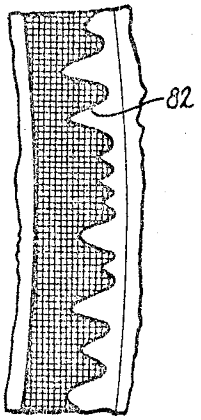

While a sound track such as shown in FIG. 7 is preferred, a single sided sound track 82 (FIG. 9) may be provided in the groove 34 of the recording disc 32 by simply replacing the light modulating shutter 50 in FIG. 3 with a shutter 84 (see FIG. 5). The light modulating shutter 84 might be opaque with a transparent area 86 as illustrated or the area 86 might be opaque on a transparent background.

Figure 10:

It is also pointed out that in all aspects of this invention, variable density sound tracks such as shown by the reference numeral 87 in FIG. 10 may be produced as an alternative to the constant density sound tracks described hereinabove. Variable density sound tracks are unmodulated or of uniform density in directions transversely across the track or groove in the recording disc but are of varying density along the length of the sound track which variable densities are modulated to be lighter or darker in accordance with the amplitude of the sound waves being recorded.

Variable density sound tracks are produced by simply replacing the light modulating shutter 50 in FIG. 3 with a conventional light valve such as is well known and commonly used in making variable density sound tracks on motion picture film or the like. Also, as it is known, other means such as a Kerr cell may be used this purpose.

Once the proper exposure of the sound track has been made in the groove 34 on the recording disc 32, the photosensitive layer 48 is processed to develop and fix the image of the sound track. The processing is performed in accordance with whatever procedure is appropriate for the particular type of photosensitive layer 48 which is applied to the recording disc 32. The photo-processing step is performed in the usual manner of developing and fixing commercial films or plates. It is pointed out that the sound tracks 72, 72*a*, 82 and 87 have been illustrated to appear as they normally would after processing and for ease and clarity of illustration, only the areas of the groove 34 have been shown as being photoprocessed. In the case where the photosensitive layer 48 is continuous over the entire surface of the recording disc 32, the entire surface area of the disc 32 with the exception of the sound tracks 72, 82 or 87 in FIGS. 7, 9 and 10 would be dark or black after processing while in the case of FIG. 8, only the sound track 72*a* in the groove would be black.

This invention relates more particularly to black and white photoprocessing since colors or other tones would be of no particular value and actually might tend to be detrimental to the fidelity in playback. The invention, however, does not exclude producing sound tracks in tones or colors other than black and white and as it can be seen in FIG. 10, a variable density sound track would embody tones ranging from white or transparency to black or opacity. All exposures for recording and/or photoprocessing would be done under lighting conditions applicable to the particular type of photosensitive material used for the layer 48.

Once the recording disc 32 has been exposed and photographically developed as described hereinabove, it may be preserved as a master from which photographic or other types of reproductions may be made therefrom or it may be used directly for playback. The latter situation will be described hereinafter, it being understood that reproductions of the recording disc 32 would be utilized in the same manner for playback.

Since, as it will become apparent hereinafter, a stylus is caused to track the photographically processed groove 34 in playing back the recording on the disc 32, it is preferable but not necessary to provide the sound track with a protective coating 90 of a transparent medium such as a lacquer or Mylar plastic or the like which may be applied by spraying or dipping or be brushed onto the grooved side of the recording disc 32 and which when dried will provide a hard protective surface. Such a protective coating 90 will avoid damaging the photo-processed layer 48 by wear due to repeated tracking of the playback stylus and prevent scratching of the photo-processed layer 48 by dust particles or the like which might become lodged under the playback stylus.

It is pointed out that, in the playback systems of this invention, proper and accurate tracking of the playback stylus can be accomplished with less than ⅙ of the usual pressure required to retain the stylus in the recording groove. This is the result of the groove having smooth side walls which are not modulated with lateral indentures or protrusions cut therein or sound reproducing purposes as is the case in conventional disc type recordings. In conventional recordings of this nature, the lateral mechanical modulations of the groove produce excessive lateral forces on the playback stylus which tend to lift it out of the groove. In order to overcome the lifting effect, forces of several grams upon the recording stylus have, heretofore, been required for proper tracking. These forces produce wear on the playback stylus and in the recording groove. In the playback systems of the invention, the slight pressures (1 gram or less) needed for accurate tracking reduce wear on the disc and stylus to a minimum.

Figure 12:
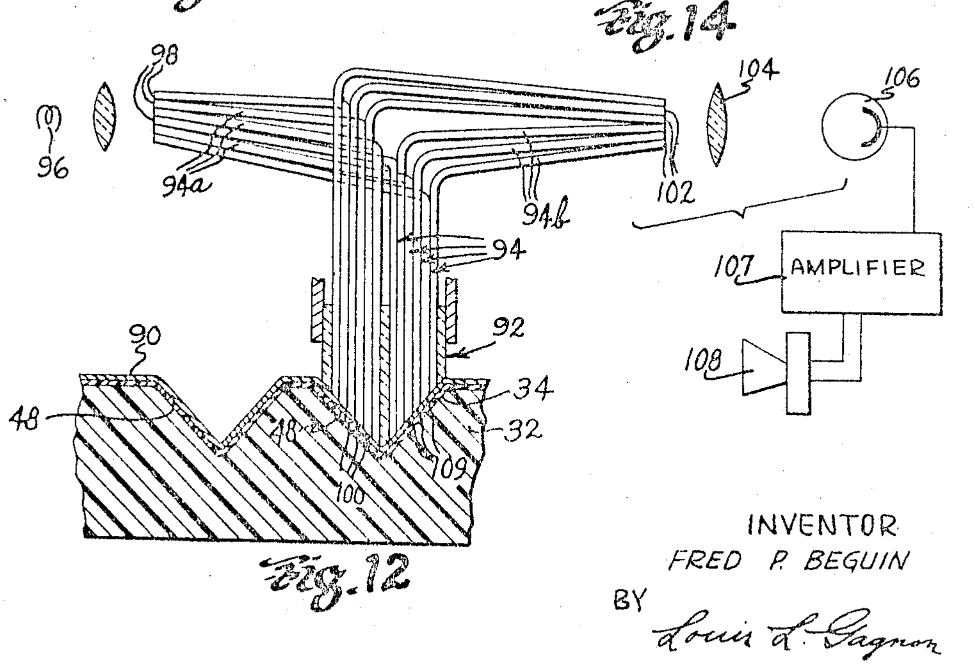
FIG. 12 is a diagrammatic illustration of a monaural playback system of the invention which is intended to utilize recordings such as are shown in the aforementioned figures of the drawings.

Referring to FIG. 12, it will be seen that the playback system illustrated therein comprises a playback stylus 92 which is substantially identical to the recording stylus 54 with the exception that certain of the optical fibers 94 therein are directed toward a light source 96 and are arranged to receive light from the source 96. Light which is directed into the respective ends 98 of the optical fibers 94*a* is transferred by said optical fibers to the walls of the groove 34 and illuminates the sound track on the photo-processed layer 48 through the transparent coating 90. If the recording disc 32 is used for playback without the coating 90, the stylus 92 rests against the layer 48 and the sound track is illuminated by diffusion of light over its surface along the immediate area defined by the ends 100 of the optical fibers 94*a*.

Other optical fibers 94*b* which extend from the playback stylus 92 are grouped together adjacent their ends 102 and function to pick up light reflected and/or diffused from the sound track on the layer 48. In so doing, they transfer this light to and emit the same from their ends 102. A lens 104 is provided to receive and direct light from the ends 102 of the optical fibers 94*b* onto a photocell 106. The photocell 106 converts the light received thereby into an electrical signal which is modulated in accordance with the intensity modulation of said light and the resultant signal is fed through a conventional audio or reproduction amplifier 107 to a speaker 108 which converts the amplified signal into sound. In playback, the recording disc 32 is preferably rotated at the same speed as that which was used to photographically record the sound track and thus the sound reproduction produced by the speaker 108 (FIG. 12) is substantially identical to the sound received by the microphone 67 (FIG. 3) from which the recording was made.

Figure 24:
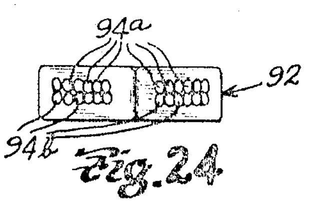
FIG. 24 is an end view of a modified stylus.

While the optical fibers 94*a* and 94*b* have been illustrated in FIG. 12 as being arranged in adjacent side-by-side relation as a single row in the stylus 92, it should be understood that the optical fibers 94*a* and 94*b* may be arranged in the stylus 92 as shown in FIG. 24 wherein the optical fibers 94*a* which illuminate the sound track in the groove 32 are placed together in a row across a single transverse meridian of the stylus 92 and the light receiving optical fibers 94*b* are likewise arranged in a separate row. The two rows of optical fibers are, in this instance, placed in adjacent back-to-back relation with each other.

Figure 20:
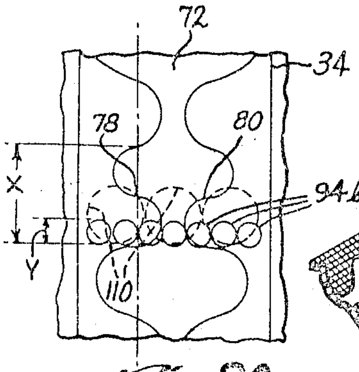
FIG. 20 is a diagrammatic plan view of a sound track of the general type relating to this invention wherein there is further illustrated a preferred size of optical fibers which are used in the recording and reproduction systems of the invention.

It can be seen that the ends 109 of the optical fibers 94*b* in the stylus 92 effectively form a scanning slit which extends transversely across the recording groove 34. This is illustrated diagrammatically in FIG. 20. As the sound track 72, which will be used for purposes of this illustration, is moved axially, its opposite edges 78 and 80 are scanned by the optical fibers 94*b*. In order to efficiently resolve the sine wave configuration of the sound track edges 78 and 80, it has been found that the optical fibers 94*b* should be equal to or smaller in diameter than ¼ of the length of a sine wave cycle which represents the highest frequency of the sound track 72. That is, the diameter of the optical fibers 94*b* should be approximately equal to or less than ¼ of the wavelength of the highest frequency which is photographically reproduced in the form of the sound track 72. Assuming that the sine wave produced by the edge 78 which extends across the distance X in FIG. 20 is one of the highest frequency waves embodied in the sound track 72, the cross-sectional size of the optical fibers 94*b* should be no larger than ¼ X; that is, equal to or smaller than the dimension Y.

The speed of rotation at which the recording disc 32 is caused to travel during recording naturally determines the actual lengths of the photographically recorded sine waves or edges 78 and 80 of the sound track 72 and therefore, in order to determine the actual size of optical fibers required to accomplish the above, this factor must be considered.

As an example, if it is known that the highest frequency of a sound recording is 10,000 cycles per second and is to be recorded on a recording disc having a 10 inch average diameter in the area where the recording is to be made with the disc being rotated at 33.3 revolutions per minute, the proper fiber size would be calculated as follows:

($\pi$) (disc diameter)=(3.14) (10)=31.4 inches of travel per each revolution of the disc;

(31.4) (speed of disc in r.p.m.)=(31.4) (33.3)=1045.6 inches per minute;

$$\frac{1045.6}{60}=17.4 \text{ inches per second}$$

$$\frac{17.4}{10{,}000 \text{ r./sec.}}=.0017 \text{ inch per cycle}$$

Thus 1 cycle or wavelength=.0017 inch and ¼ cycle or ¼ wavelength=.0004 of an inch or approximately 10 microns. Therefore, for the above given example, the diameters of each of the optical fibers 94*b* should be approximately 10 microns or less.

It can be seen that if larger optical fibers were used such as shown by the phantom outlines 110, the wave form of the edges 78 and 80 of the sound track would not be adequately resolved. In such a case, only an intermittent blanking and admission of light into the fibers 110 between the adjacent successive peaks of the wave forms would result and the playback would be seriously distorted.

It is also pointed out that in a manner analagous to the above determination of optical fiber size preferred for playback the same consideration should be given to the recording optical fibers 52 used in the recording stylus 54 and these optical fibers should also be of a size approximately equal to or less than ¼ of a wavelength of the highest frequency sound wave to be photographically recorded in order to produce acceptable photographic reproductions of these highest tones or sound frequencies.

Figure 13:
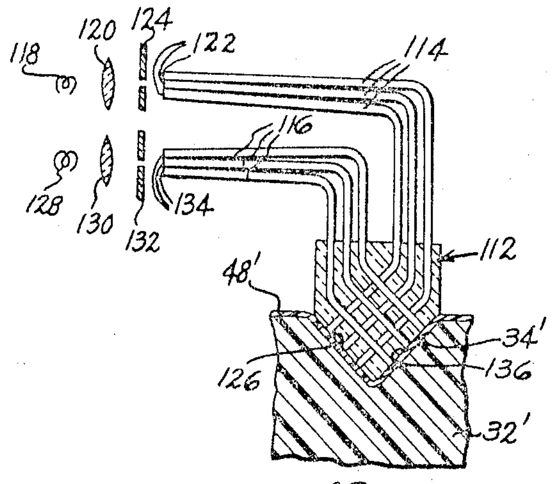
FIG. 13 is a diagrammatic illustration of a binaural or stereophonic recording system and apparatus.

In FIG. 13 there is diagrammatically illustrated a recording system generally similar to the system of FIG. 3 but which is modified so as to produce a binaural or two channel sound track in the groove 34′ of a recording disc 32′ which is cut and provided with a photosensitive layer 48′ in a manner identical to that described hereinabove with relation to the recording disc 32. In this instance, a recording stylus 112 having a depending V-shaped lower section adapted to fit within the groove 34′ is provided with optical fibers 114 leading to one side of its V-shaped section and other optical fibers 116 leading to the opposite side thereof. The optical fibers 114 provide a first recording channel for directing recording light to one side of the groove 34′ and the optical fibers 116 provide a second recording channel for directing recording light to the opposite side of the groove 34′. A light source 118 and a lens or lens system 120 is provided to direct light onto the ends 122 of the fibers 114 which light is modulated by a suitable light modulating member 124. The light modulating member 124 functions to modulate the light received by the optical fibers in accordance with a preselected channel of sound desired to be photographically reproduced upon the side 126 of the groove 34′. In a similar manner, a light source 128, lens or lens system 130 and light modulating means 132 is provided to direct light onto the ends 134 of the fibers 116 so as to produce a photographic recording of another preselected channel of sound on the other side 136 of the groove 34′.

It is pointed out that the light modulating members 124 and 132 have been shown only diagrammatically to simplify and avoid repetition in the drawing. Actually the members 124 and 132 would each be in the form of a transducer such as shown in FIG. 3 and which embodies the parts 50, 65, 66 and 68 or any one of the alternative light modulating arrangements mentioned hereinabove.

Figure 14:
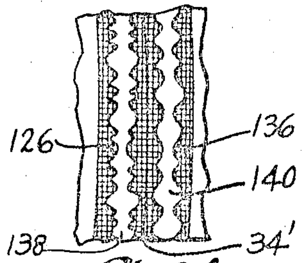
FIG. 14 is a plan view of a binaural photographic sound recording or track such as might be produced with the apparatus of FIG. 13.

In recording the two channels or stereophonic sound tracks in the groove 34′ the recording disc is rotated on a turntable and the stylus 112 is caused to track the groove 34′. The procedure is identical to that described above with relation to FIG. 3 with the exception that the light which is transferred by each of the sets of optical fibers 114 and 116 is differently frequency and amplitude modulated so as to produce, for example, a sound track 138 (see FIG. 14) of relatively high frequency on the side 126 of the groove 34′ and a sound track 140 of relatively low frequency on the side 136 of the groove 34′. The recording disc 34′ is photoprocessed in a manner identical to that described above with relation to the recording disc 32. The sound tracks 138 and 140 may, of course, be of the same or substantially the same frequency and amplitude.

Figures 15, 18:
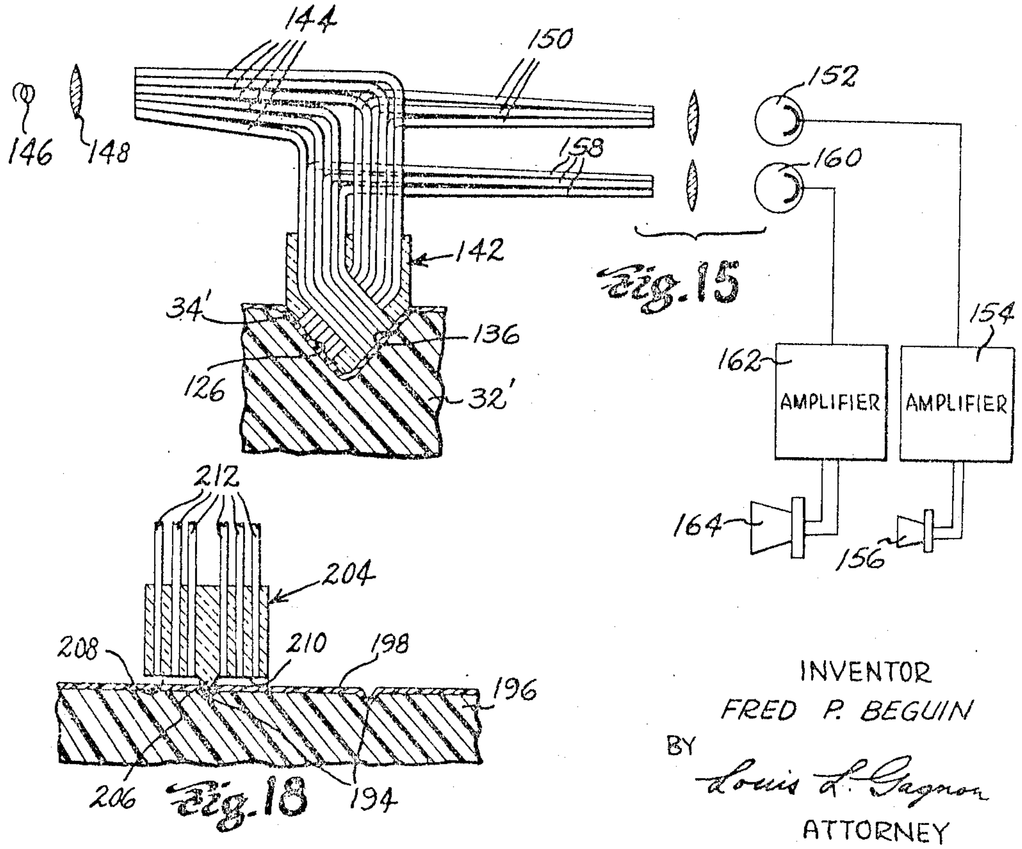
FIG. 15 is a diagrammatic illustration of a binaural or stereophonic playback system adapted to utilize recordings such as would be made by the recording system of FIG. 13.
FIG. 18 is a diagrammatic illustration of a technique and apparatus for producing and/or playing back modified stereophonic photographic sound tracks.

Playback of the recording disc 32′ is shown diagrammatically in FIG. 15 and is accomplished in a manner substantially identical to that described above with relation to the playback system of FIG. 12. In this case, however, the playback stylus 142 has light-conducting optical fibers 144 which are arranged as illustrated to illuminate the opposite sides 126 and 136 of the groove 34′ (see FIG. 15). Light is directed into the optical fibers 144 from a source 146 through a lens or lens system 148.

Light from the optical fibers 144 which is diffused by the respective sound tracks 138 and 140 is received or picked up by a separate array of optical fibers arranged to receive the same from each sound track. The optical fibers 150 receive light from the sound track 138 on the side 126 of the groove 34′ and direct the same to a photocell 152 which converts the light which is modulated by the sound track 138 into an accordingly modulated electrical signal. The electrical signal is amplified at 154 and fed to a speaker 156. The speaker then produces a sound which is amplitude modulated in accordance with the geometrical characteristics of the sound track 138.

Light from the optical fibers 144 which illuminates the sound track 140 is received by the optical fibers 158, directed to a photocell 160 and converted thereby into an electrical signal which is amplified at 162 and reproduced as sound by a speaker 164. The two speakers will operate simultaneously and thereby produce a stereophonic effect.

Figure 11:
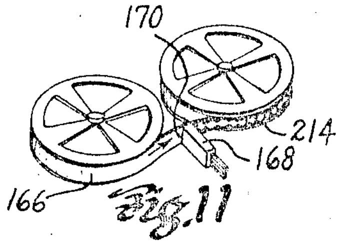
FIG. 11 is a diagrammatic illustration, in perspective, of means which may be employed in accordance with the invention to produce photographic sound recordings on tape or film-like materials.

As shown in FIG. 11, sound tracks of the above described character may be produced upon opaque or transparent film or tape material 166 and/or played back therefrom by means of a head 168 which, instead of being V-shaped as in the case of the above described styli is contoured substantially as illustrated and is held stationary while the film or tape 166 is directed over its face 170. Other than utilizing the head 168 in place of any one of the above described styli, the systems for recording and playback of film or tape in accordance with this invention are identical to those described above with relation to the discs 32 and 32'.

Figure 16:
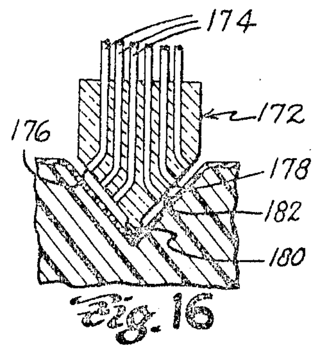
FIGS. 16 and 17 are illustrations of modified recording grooves and styli intended to be used therewith.

In FIG. 16 there is shown a modified stylus 172 having optical fibers 174 leading to and/or from its inclined sides 176 and 178. The stylus 172 is provided with a depending ball shaped portion 180 which is intended to ride in the apex of the recording groove 182. The recording groove 182 is identical to the groove 34 described above. The ball shaped portion 180 provides means for causing the stylus 172 to track the groove and at the same time, holds the inclined sides 176 and 178 of the stylus away from the respective adjacent sides of the groove 182. This avoids producing wear or scratching by dust accumulation or the like on the sides of the recording groove 182.

Figure 17:
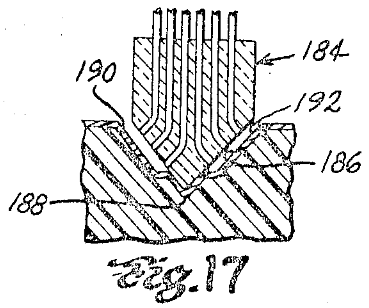

In order to accomplish substantially the same result as that obtainable with the stylus 172 while using a stylus 184 contoured like the styli 54, 92, 112 or 142, a recording groove 186 having its opposite sides cut back may be provided as shown in FIG. 17. In this arrangement the apex 188 of the groove 186 is centered between the opposite sides of the groove and is used only for guiding the stylus 184. Recordings are produced on the cut-back opposite sides 190 and 192 of the groove 186.

Figure 19:
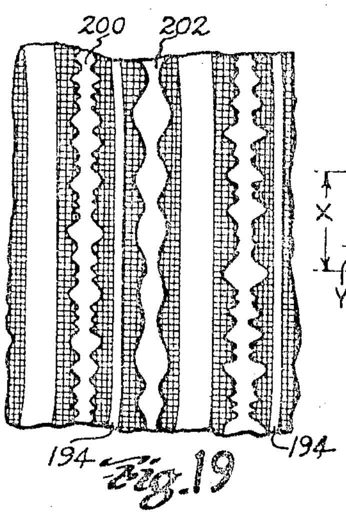
FIG. 19 is a plan view diagrammatically illustrating a stereophonic recording such as might be produced with the apparatus of FIG. 18.

A further modification of the invention (see FIGS. 18 and 19) is to provide a shallow tracking groove 194 in a recording disc 196, provide the grooved surface of the disc 196 with a photosensitive surface 198 and to record the photographic sound tracks 200 and 202 upon the ungrooved surface areas of the disc 196 as shown in FIG. 19. The sound tracks 200 and 202 together provide a stereophonic sound track wherein the track 200 which will be referred to as a channel 200 is a photographic reproduction of relatively high frequency sound and the track or channel 202 is a photographic reproduction of relatively low frequency sound.

In making and playing back such recordings, styli such as the one shown in FIG. 18 by the reference numeral 204 are used. The stylus 204 is generally rectangular with a depending V-shaped protuberance 206 which fits into the groove 194 and causes the stylus 204 to track said groove 194 with the flat under surfaces 208 and 210 of the stylus spaced from the photosensitive surface 198. Light conducting fibers 212 extend through the stylus 204 to the surfaces 208 and 210 thereof and are employed for producing and/or playing back the sound tracks or channels 200 and 202 in a manner identical to that heretofore described with relation to the optical fibers in the stylus 112 or 142. The systems described above for recording and playback are used in conjunction with the stylus 204.

Figure 21:
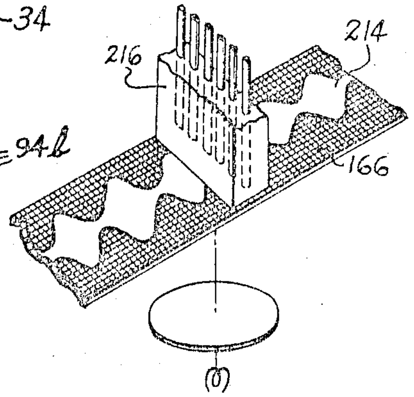
FIG. 21 is a perspective view diagrammatically illustrating a playback system for use with tape or film type recordings.

In FIG. 21 it is illustrated that the playback of transparent film or tape 166 which is recorded as shown in FIG. 11 may be accomplished by projecting light through the film or tape wherein the light which is received by a playback head 216 is modulated by the configuration of the sound track 214.

Figure 22:
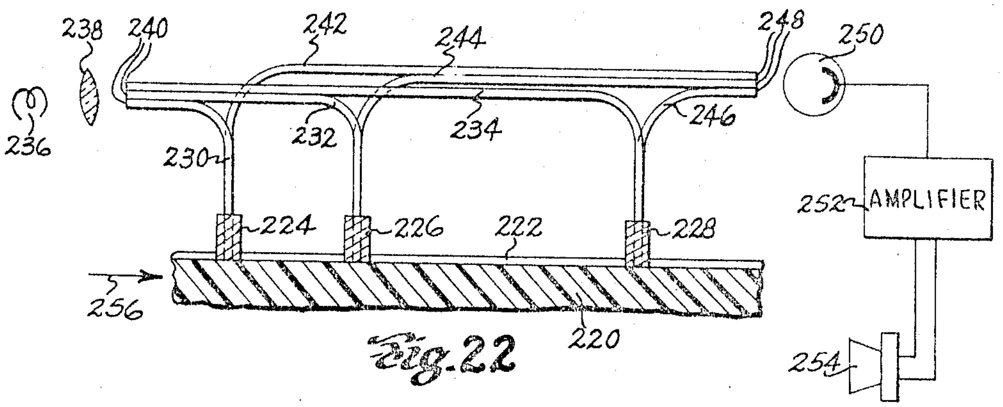
FIG. 22 is a diagrammatic illustration of a sound reverberation system such as might be applied more particularly to a grooved type or opaque recordings formed in accordance with the present invention.
Figure 23:
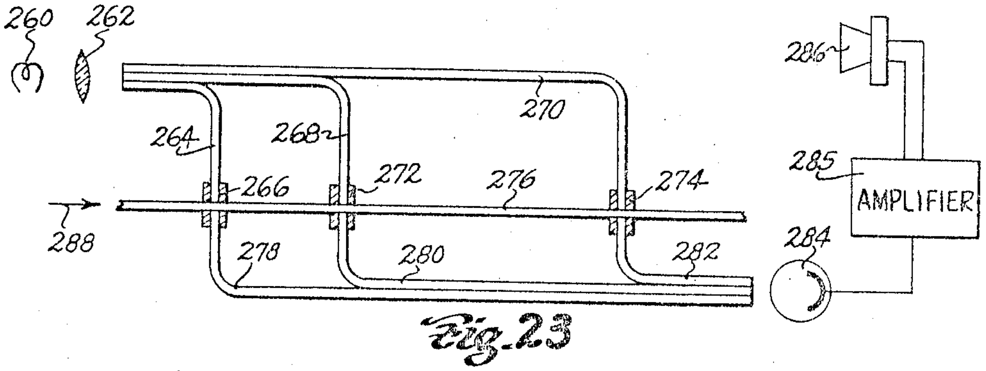
FIG. 23 is a diagrammatic illustration of a sound reverberation system adaptable more particularly to a transparent type of recording.

In FIGS. 22 and 23 sound reverberation systems are illustrated. In FIG. 22 a system adaptable to the playback of recordings on opaque materials is shown while FIG. 23 illustrates a system arranged more particularly for playing back recordings on transparent materials.

Referring more particularly to FIG. 22, a fragmentary cross-sectional view of a recording disc 220 having a groove 222 is shown for purposes of illustration. The cross-section of the recording disc 220 is taken substantially along the axis of the groove 222 which embodies a photographic sound track which may be similar to the sound track 72 in FIG. 7 or alternatively like any one of the other sound tracks shown and described hereinabove.

Fiber optical styli 224, 226 and 228 are provided and arranged to track the groove 222 as the disc 220 is rotated. The styli 224, 226 and 228 which are shown diagrammatically would preferably be of the type referred to as 142 in FIG. 15 but might be modified in the nature of the above described stylus 172 (FIG. 16) or 204 (FIG. 18). As in the usual construction of the above described styli, each stylus 224, 226 and 228 is provided with a plurality of optical fibers 230, 232 and 234 respectively which are extended away therefrom and are grouped together adjacent their opposite ends. A light source 236 and lens or lens system 238 is provided to direct light into the ends 240 of the optical fibers 230, 232 and 234.

Also extending from each stylus 224, 226 and 228 is a plurality of other optical fibers 242, 244 and 246 respectively which at their ends 248 opposite the styli are grouped together substantially as illustrated. Light from the source 236 is directed by the optical fibers 230, 232 and 234 onto the sound track in the groove 222 wherein it is picked up by the optical fibers 242, 244 and 246 and emitted at their respective ends 248. The picked-up light is, of course, modulated by the configuration of the photographic sound track in the groove 222 and it is directed onto a photocell 250 wherein it is conventionally converted into an electrical signal. The signal is amplified by an amplifier 252 and fed to a speaker 254 by means of which it is reproduced as sound.

Sound reverberations are produced by placing the styli 224, 226 and 228 at different preselected spaced distances from each other along the groove 222. That is, with the disc moving in the direction of arrow 256, for example, the stylus 224 would first sense a particular portion of the sound track which would be reproduced as sound by the speaker 254. At a later interval determined in accordance with the rate of movement of the disc 220 and the distance between the stylus 224 and the stylus 226, the stylus 226 would next sense the same portion of the sound track which would again be reproduced as an echo by the speaker 254. Likewise, the stylus 228 would, for the third time, sense the above-mentioned portion of the sound track and again cause it to be reproduced as a second echo by the speaker 254. Thus, the sound reverberation effect is produced. The time delay of the echoes is determined by the rate of movement of the disc 22 relative to the styli 224, 226 and 228 and the selected distance between said styli. The echo producing styli 226 and 228 might be positioned with the ends of their respective optical fibers spaced away from the soundtrack area of the groove 222 so as to diffuse and/or soften the resultant audio reproduction thereof. This might be accomplished with styli and groove constructions such as are shown in FIGS. 16 and 17 or with variations thereof.

Alternatively, the ends 240 and/or 248 of the optical fibers 232, 234, 244 or 246 might be coated with a semi-transparent plastic, lacquer or any medium which is adapted to reduce the intensity of light received and/or emitted from the said fibers by precontrolled amounts in accordance with the level of sound desired for the echoes. The level of sound may also be suppressed electronically in the amplifier 252.

It is pointed out that more or less styli would be used in the system of FIG. 22 in accordance with the number of echoes desired.

The sound reverberation system of FIG. 23 is basically similar to that of FIG. 22. It, however, embodies a light source 260 and light-directing lens or lens system 262 which is arranged to direct light into a plurality of optical fibers 264 which lead to a first stationary playback stylus 266. Other optical fibers 268 and 270 are similarly arranged in styli 272 and 274. Light is projected into the optical fibers 264, 268 and 270 and passes through the recording medium 276 which, in this instance would be a tape or film or a transparent disc or the like. The light is modulated by the sound track provided on the medium 276 and is received by the respective optical fibers 278, 280 and 282 which direct it to a photocell 284 wherein it is converted into an electrical signal which is amplified at 285 and reproduced as sound by a speaker or the like 286.

The medium 276 is moved in the direction of the arrow 288 and, in a manner analogous to that described above for the system of FIG. 22, a sound reverberation effect is produced. The echoes may be tuned to different amplitudes by adjusting the proximity of the styli 266, 272 or 274 to the medium 276 or preferably by moving the light-receiving optical fibers 278, 280 and 282 closer or further away from the medium 276. Alternatively, light masking means might be applied to one or the other of the ends of certain fibers for varying the amplitudes of the echoes as described above with relation to FIG. 22 or the level of sound may be suppressed electronically in the amplifier 285 circuits.

It is pointed out that the optical fibers which have been referred to throughout this specification may be constructed of special glasses having preselected light-conducting characteristics and that the light sources referred to herein may be either conventional incandescent or photoflood lamps or mercury arc lamps or the like for producing actinic light or light of other preselected wavelengths which is more particularly suited for certain photosensitive mediums or emulsions such as might be selected in producing the above-described photosensitive recordings. Also, the above described recordings may be reproduced by optical means or by contact photographic printing techniques more particularly when the recordings are produced upon transparent base materials or they may be otherwise photocopied upon pregrooved pressings. Alternatively, the sound tracks and groove locations may be reproduced by conventional photoresist duplicating processes, diazo duplication techniques or by any conventional screen printing process or the like.

From the foregoing, it can be seen that simple and efficient means and method have been provided for accomplishing all of the objects and advantages of the invention. Nevertheless, many changes in the details of construction, arrangement of parts or steps in the method may be made without departing from the spirit of the invention as expressed in the accompanying claims and the invention is not to be limited to the exact matters shown and described as only preferred matters have been given by way of illustration.

Having described my invention, I claim:

1. Apparatus for making a photographic recording of sound comprising a stylus having a main supporting body part, an array of long and thin optical fibers extending through said body part with corresponding first ends of said fibers exposed and arranged contiguously in a row, said fibers each being of a cross-sectional size smaller than the resolution desired of said recording and embodying a core section of light-conducting material having a relatively high index of refraction surrounded by a relatively thin cladding of material having a lower index of refraction than said core, corresponding opposite ends of said fibers being arranged substantially in the same geometrical order as said first ends thereof, means for producing a line of light along the length of the row of said opposite ends of said fibers, means for varying the length of said line in accordance with the instantaneous amplitude of a sound wave to be recorded, a light sensitive medium adjacent the said first ends of said array at said stylus and means for providing relative motion between said stylus and said medium along a line transverse to the length of said array.

2. Apparatus for making a photographic recording of sound comprising a stylus having a main supporting body part, an array of long and thin optical fibers extending through said body part to a side thereof with corresponding light-emitting ends of said fibers exposed adjacent said side of said body part and arranged contiguously in a row, said fibers each being of a cross-sectional size smaller than the resolution desired of said recording and embodying a core section of light-conducting material having a relatively high index of refraction surrounded by a relatively thin cladding of material having a lower index of refraction than said core, corresponding opposite light-receiving ends of said fibers being arranged in a row substantially in the same geometrical order as said first ends thereof, means for producing a line of light along the length of the row of said light-receiving ends of said fibers, means for varying the length of said line in accordance with the instantaneous amplitude of a sound wave to be recorded, a light sensitive medium adjacent the said light-emitting ends of said array adjacent said stylus and means for providing relative motion between said stylus and said medium along a line transverse to the length of said array.

3. Apparatus for making a photographic recording of sound comprising a stylus having a main supporting body part, a plurality of long and thin optical fibers extending through said body part with corresponding first ends thereof exposed and arranged contiguously in a row, said fibers each being of a cross-sectional size smaller than the resolution desired of said recording and embodying a core section of light-conducting material having a relatively high index of refraction surrounded by a relatively thin cladding of material having a lower index of refraction than said core, corresponding opposite ends of said fibers being disposed in a row and arranged substantially in the same geometrical order as said first ends thereof, means adjacent said opposite ends of said fibers for directing light thereonto and for modulating said light in accordance with the frequency characteristics of sound to be recorded, a photosensitive medium for receiving said recording, means for supporting said medium and said stylus with said first ends of said fibers directed toward said medium and in adjacent relation therewith and means for introducing relative motion between said stylus and recording medium in a direction substantially transverse to the length of said row of first ends of said fibers.

4. Apparatus for making a photographic recording of sound on a disc having a spiral groove with a photosensitive medium in said groove for receiving said recording comprising means for rotatably supporting said disc, a stylus having a main body part with a side shaped to substantially the transverse configuration of said groove and adapted to fit thereinto, means for supporting said stylus with said side thereof disposed within said groove in adjacent relation to said photosensitive medium, a plurality of long and thin optical fibers extended through said body part of said stylus with corresponding first ends thereof exposed adjacent said side of said body part and arranged contiguously in a row extending transversely of said groove, said fibers each embodying a core part of light-conducting material having a relatively high index of refraction surrounded by a relatively thin cladding of material having an index of refraction lower than said core part, corresponding opposite ends of said fibers being disposed in a row and arranged substantially in the same geometrical relationship as said first ends thereof, means adjacent said opposite ends of said fibers for directing light thereonto and for modulating said light in accordance with the frequency characteristics of sound to be recorded and means for rotating said disc in the plane thereof for introducing relative motion between said stylus and said photosensitive medium in a direction substantially transverse to said row of said first ends of said fibers.

5. Apparatus for producing sound from a recording medium having a relatively long and narrow photographic sound track comprising a stylus having a main supporting body part, a plurality of long and thin optical fibers extending through said body part with corresponding first ends of said fibers exposed and arranged contiguously in a row, said fibers each being of a cross-sectional size smaller than the resolution desired of said recording and embodying a core section of light-conducting material having a relatively high index of refraction surrounded by a relatively thin cladding of material having an index of refraction lower than that of said core section, means for supporting said recording medium and said stylus for movement of one relative to the other and with said row of first ends of said fibers disposed adjacent said sound track, a light source remote from said stylus, opposite ends of certain of said fibers being arranged adjacent said light source to receive light therefrom and illuminate said sound track by internal reflection through said certain fibers, opposite ends of remaining fibers being grouped together remotely of said stylus, means adjacent said opposite ends of said remaining fibers for receiving and transducing light into sound and means for introducing relative movement between said stylus and recording medium in a direction transverse to said row of first ends of said fibers.

6. A light-connecting stylus for use with sound recording and playback devices comprising a rigid body part having one end shaped to engage with a surface having an optical sound track recording, a plurality of long and thin optical fibers extending through said body part with corresponding first ends thereof terminating adjacent said one end of said body part and arranged contiguously in a row across said one end transverse to the direction of motion of said stylus along said recording, each of said fibers embodying a light-conducting core part having a relatively high index of refraction and a thin cladding of material thereon having a lower index of refraction than said core part.

7. The method of making a photographic recording of sound on a light sensitive recording medium comprising directing light to a light-receiving station remote from said medium, modulating said light so as to cause amounts thereof received at said station to vary substantially instantaneously according to variations in amplitude of said sound, receiving said modulated light at said station along a long and thin zone having a thickness dimension substantially no greater than the minimum degree of resolution desired of said recording, dividing said modulated light at said zone into a plurality of contiguously related fractional parts each having no one dimension greater than said thickness dimension, transferring said parts of said light independently of each other by internal reflection to a long and thin light-emitting zone at a station adjacent said recording medium and moving said recording medium across said light-emitting zone in a direction generally normal to the longest dimension of said zone to produce said recording by exposing a succession of long and thin transverse sections of an extended portion of said medium each to an amount of light determined by the modulation thereof occurring during the period of registry of said transverse section with said light-emitting zone.

8. The method of making a photographic recording of sound on a light sensitive recording medium comprising directing light to a light-receiving station remote from said medium, modulating said light so as to cause amounts thereof received at said station to vary substantially instantaneously according to variations in amplitude of said sound, receiving said modulated light at said station along a long and thin zone having a thickness dimension substantially no greater than ¼ of a wavelength of the highest frequency wave of sound to be recorded, dividing said modulated light at said zone into a plurality of contiguously related fractional parts each having no one dimension greater than said thickness dimension, transferring said parts of said light independently of each other by internal reflection to a long and thin light-emitting zone at a station adjacent said recording medium and moving said recording medium across said light-emitting zone in a direction generally normal to the longest dimension of said zone to produce said recording by exposing a succession of long and thin transverse sections of an extended portion of said medium each to an amount of light determined by the modulation thereof occurring during the period of registry of said section with said light-emitting zone.

9. The method of making a photographic recording of sound on a light sensitive recording medium comprising directing light to a long and thin light-receiving zone at a first station remote from said medium, said light receiving zone having a thickness dimension substantially no greater than the minimum degree of resolution desired of said recording, modulating said light so as to cause various extents of the length of said zone to be illuminated in accordance with variations in amplitude of said sound, dividing said modulated light at said receiving zone into a plurality of contiguously related fractional parts each having no one dimension greater than said thickness dimension, transferring said parts of said light independently of each other by internal reflection to a long and thin light-emitting zone at a second station adjacent said recording medium and moving said recording medium across said light-emitting zone in a direction generally normal to the longest dimension of said zone to produce said recording by exposing a succession of long and thin transverse sections of an elongated portion of said medium, said sections each being exposed to an extent according to the particular degree of modulation of said light occurring during the period of registry of said transverse section with said light-emitting zone.

10. The method of making a photographic recording of sound on a light sensitive recording medium comprising directing light to a long and thin light-receiving zone at a first station remote from said medium, said light-receiving zone having a thickness dimension substantially no greater than the minimum degree of resolution desired of said recording, modulating said light so as to cause its intensity to vary according to variations in amplitude of said sound, dividing said modulated light at said receiving zone into a plurality of contiguously related fractional parts each having no one dimension greater than said thickness dimension, transferring said parts of said light independently of each other by internal reflection to a long and thin light-emitting zone at a second station adjacent said recording medium and moving said recording medium across said light-emitting zone in a direction generally normal to the longest dimension of said zone to produce said recording by exposing a succession of long and thin transverse sections of an elongated portion of said medium, said sections each being exposed to light of an intensity according to the particular degree of modulation of said light occurring during the period of registry of said transverse section with said light-emitting zone.

11. The method of producing sound from a long and relatively narrow sound track adapted to modulate light directed thereonto according to sound characterized variations of a sound recorded on said track comprising, directing light onto said track for modulation thereof, receiving said modulated light along a long and thin light-receiving zone at a station adjacent said track, said zone extending across substantially the full width of said track and being of a thickness substantially no greater than the smallest dimension of the sound characterized variations which represent the highest frequencies of recorded sound on said track, dividing said received modulated light into a plurality of contiguously related fractional parts, transferring said fractional parts of said light independently of each other by internal reflection to a light emitting station, moving said sound track longitudinally across said light receiving zone and transducing said modulated light into sound as said light is received at said emitting station.

References Cited by the Examiner

UNITED STATES PATENTS

| | | | |
|---|---|---|---|
| 1,751,584 | 3/1930 | Hansell | 178—6.7 |
| 1,859,423 | 5/1932 | Arnold | 179—100.2 |
| 1,940,937 | 12/1933 | Burt | 179—100.3 |
| 1,967,882 | 7/1934 | Hammond | 179—100.3 |
| 2,208,937 | 7/1940 | Schwarz | 274—5 |
| 2,616,983 | 11/1952 | Zworykin | 179—100.3 |
| 2,654,810 | 10/1953 | Miessner | 179—100.3 |

FOREIGN PATENTS

| | | |
|---|---|---|
| 431,625 | 7/1935 | Great Britain. |

IRVING L. SRAGOW, *Primary Examiner.*

JOHN P. WILDMAN, BERNARD KONICK, *Examiners.*